United States Patent
Hinchman et al.

(10) Patent No.: US 11,766,972 B2
(45) Date of Patent: Sep. 26, 2023

(54) LOW-PROFILE, BACKLIT, PANEL ASSEMBLY FOR DISPLAYING IMAGES AND/OR DATA WITHIN A PASSENGER COMPARTMENT OF A VEHICLE

(71) Applicant: JVIS-USA, LLC, Shelby Township, MI (US)

(72) Inventors: David Donovan Hinchman, Livonia, MI (US); Darius J. Preisler, Macomb, MI (US); Jason T. Murar, Shelby Township, MI (US); Rachel Elisabeth Schmidt, Fenton, MI (US); Ryan Richard Lucas, Royal Oak, MI (US); Cedric Alves, Laguna Niguel, CA (US); James Wagner, Farmington Hills, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 0 days.

(21) Appl. No.: 17/331,707

(22) Filed: May 27, 2021

(65) Prior Publication Data
US 2021/0284078 A1 Sep. 16, 2021

Related U.S. Application Data

(63) Continuation-in-part of application No. 16/237,967, filed on Jan. 2, 2019.

(51) Int. Cl.
*B60R 11/02* (2006.01)
*B60K 35/00* (2006.01)

(52) U.S. Cl.
CPC .......... *B60R 11/0235* (2013.01); *B60K 35/00* (2013.01); *B60K 2370/1523* (2019.05);
(Continued)

(58) Field of Classification Search
CPC ......... B60R 11/0235; B60R 2011/0276; B60R 2011/0022; B60R 2011/0028;
(Continued)

(56) References Cited

U.S. PATENT DOCUMENTS 5,895,115 A 4/1999 Parker et al.
6,124,647 A * 9/2000 Marcus .............. G02B 27/0101
362/494
(Continued)

FOREIGN PATENT DOCUMENTS

GB 2492100 A 12/2012

OTHER PUBLICATIONS

Jong Jin Park, et al., Giant Acoustic Concentration by Extraordinary Transmission in Zero-Mass Metamaterials, Institute of Physics and Applied Physics, Yonsei University, Seoul 120-749, Korea, Department of Physics, Ewha Womans University, Seoul 120-750, Korea, Division of Applied Physics, Faculty of Engineering, Hokkaido University, Sapporo 060-8628, Japan, published Jun. 13, 2013.
(Continued)

*Primary Examiner* — David D Davis
(74) *Attorney, Agent, or Firm* — Brooks Kushman P.C.

(57) ABSTRACT

A low-profile, backlit panel assembly and a controller for displaying images and/or data within a passenger compartment of a vehicle are provided. The assembly includes a substrate panel perforated with a two-dimensional array of closely-spaced holes. The panel is configured to be attached to a support structure of the vehicle. The assembly further includes a plurality of semiconductor-based, lighting devices supported at a back surface of the panel. Each of the lighting devices includes at least one lighting element. Each of the lighting elements is individually addressable by the controller to control luminous intensity of the light emitted by the at least one lighting element. Each of the lighting devices is aligned with one of the holes so that light emitted by each of the lighting devices travels through its hole to the passenger compartment in the form of a pixel of a two-dimensional image.

18 Claims, 9 Drawing Sheets

(52) U.S. Cl.
CPC .... *B60K 2370/34* (2019.05); *B60K 2370/816* (2019.05); *B60R 2011/0276* (2013.01)

(58) Field of Classification Search
CPC ..... B60R 2011/0043; B60R 2011/0282; B60R 2011/0288; B60R 2300/202; B60K 35/00; B60K 2370/1523; B60K 2370/34; B60K 2370/816; B60K 2370/333; B60K 2370/98; B60Q 3/14; B60Q 3/745; B60Q 3/80; B60Q 3/54; H05B 47/18; H05B 47/155; G09G 2380/10; G09G 3/2003; G09G 3/2085; G09G 3/32
See application file for complete search history.

(56) References Cited

U.S. PATENT DOCUMENTS

| | | | |
|---|---|---|---|
| 6,158,867 A | 12/2000 | Parker et al. | |
| 8,627,586 B2* | 1/2014 | Bozio | B60R 13/0256 40/580 |
| 9,834,136 B2 | 12/2017 | Roberts et al. | |
| 10,672,327 B1 | 6/2020 | Hinchman et al. | |
| 2006/0202617 A1* | 9/2006 | Yamada | B60K 35/00 313/512 |
| 2009/0021497 A1* | 1/2009 | Wendler | H05B 47/00 345/204 |
| 2011/0225859 A1* | 9/2011 | Safavi | G09G 3/3611 40/448 |
| 2013/0181398 A1 | 7/2013 | Stellenberg et al. | |
| 2015/0307033 A1* | 10/2015 | Preisler | B60Q 3/20 296/1.08 |
| 2016/0358997 A1* | 12/2016 | Bae | B60R 21/2165 |
| 2018/0190046 A1 | 7/2018 | Levinson et al. | |
| 2018/0218669 A1 | 8/2018 | Huebner et al. | |
| 2018/0222383 A1 | 8/2018 | Mueller et al. | |
| 2018/0257557 A1 | 9/2018 | Bruegl | |
| 2018/0281701 A1* | 10/2018 | Preisler | B60R 13/005 |

OTHER PUBLICATIONS

United States Patent and Trademark Office, Final Office Action for U.S. Appl. No. 16/237,967 dated Jul. 14, 2022.

* cited by examiner

LOW-PROFILE, BACKLIT, PANEL ASSEMBLY FOR DISPLAYING IMAGES AND/OR DATA WITHIN A PASSENGER COMPARTMENT OF A VEHICLE

CROSS-REFERENCE TO RELATED APPLICATION

This application is a continuation-in-part application of U.S. patent application Ser. No. 16/237,967, filed on Jan. 2, 2019.

TECHNICAL FIELD

This invention generally relates to backlit panel assemblies for vehicles and, in particular, to low-profile, backlit panel assemblies for vehicles which assemblies are configured to display imagery and/or data within passenger compartments of vehicles.

OVERVIEW

Many molded parts are used in the interior of vehicles. The substrate panel of the part is often made of plastic or of a fibrous molding material.

Natural fiber composite panels utilized as a substrate have very important characteristics because of their light weight and high environmental sustainability.

The substrate of the molded part may be realized in a laminar fashion and has an essentially plane contour or a three-dimensional contour with convex and concave regions defined by the respective design, as well as, if applicable, one or more openings and recesses. In order to fix the molded parts in the passenger compartment or on the vehicle door and to mount handles, control elements and storage trays on the molded part, the molded part is also equipped with mounting parts that are also referred to as retainers.

The substrate typically consists of plastics or composite materials that contain plastics such as acrylonitrile-butadiene-styrene (ABS) or polypropylene (PP). Fibrous molding materials on the basis of textile fabrics of hemp, sisal, flax, kenaf, and/or wood components such as wood fibers, wood dust, wood chips or paper bound with duroplastic binders are likewise used as material for the substrate. Foamed materials of polyurethane or epoxy resins that, if applicable, are reinforced with natural fibers or glass fibers may also be considered as material for the substrate.

The side of the respective molded part or substrate that faces the vehicle interior is usually referred to as the visible side. In order to provide the visible side with an attractive appearance, the substrate is equipped with one or more decorative elements of a textile material or a plastic film. The plastic films are used for this purpose are usually colored and have a relief-like embossed surface. If applicable, the decorative elements comprise a cushioning layer of a foamed plastic that faces the substrate and provides the molded part with pleasantly soft haptics. The decorative elements are usually laminated onto the substrate or bonded thereto during the manufacture of the substrate by means of thermoplastic back-injection molding.

On its edge and/or on an installation side that lies opposite of the visible side, the substrate is advantageously equipped with projections, depressions and bores. The projections, depressions and bores serve for non-positively connecting the molded part to sections of the car body such as a car door or the roof of a passenger compartment by means of retaining elements such as clips, pins and screws.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction and may include leather. However, difficulties have arisen in attempting to use leather on molded parts or substrates.

Leather is a general term for tanned hides whose original fiber structure is retained substantially intact. Excluding splits or parts of the skin that were removed prior to tanning and are not used as automobile leather on principle, the leather comprises a grain layer, or top skin, and a dermis. The top skin makes up only a fraction of the total thickness of the leather.

Natural leather is a nonuniform material whose thickness, tear strength and surface finish vary over a wide range. Attempts have been made to glue or otherwise adhere pieces of leather over molded or other preformed vehicle interior parts. Difficulties have arisen in obtaining proper adhesion of the leather to the preformed part. The leather will loosen and/or peel away from the underlying substrate or part over time. Other attempts have incorporated leather sheets sewn or otherwise made from multiple leather pieces. However, such products have required raised, sewn seams, and have not provided the desired smooth finished leather look desired by vehicle manufacturers. Moreover, the labor-intensive costs associated with producing such covers have been high.

A concurrent problem in the use of leather covered, molded articles generally have been the inability to obtain a proper leather grain appearance on the exposed surface of the article. Manufacturing procedures in applying leather covers to pre-formed articles with adhesives and the like have often diminished the naturally appearing grain in the leather and provided an almost smooth appearance instead of the desired natural leather grain. In addition, it has been difficult with past procedures to properly adhere the leather to a preformed article such that the leather remains secured to the article for proper appearance over its life.

In the automotive industry, it is common practice to refer to various surfaces as being A-, B-, or C-surfaces. As used herein, the term "A-surface" refers to an outwardly facing surface for display in the interior of a motor vehicle. This surface is a very high visibility surface of the vehicle that is most important to the observer or that is most obvious to the direct line of vision. With respect to motor vehicle interiors, examples include dashboards, door panels, instrument panels, steering wheels, head rests, upper seat portions, headliners, load floors and pillar coverings.

Light emitting panel assemblies in automotive applications are generally known and disclosed in U.S. Pat. Nos. 5,895,115 and 6,158,867.

As disclosed in U.S. Patent Publication No. 2018/0281701, interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light. Although incandescent lamp systems can often be integrated into various vehicle interior trim components in a simple manner, various considerations do arise which complicate their use for automotive lighting. For example, where heat from the lamp could damage adjacent components or otherwise cause problems, thermal management of that heat must be implemented. Also, there is often little room in or behind a particular vehicle interior body panel or trim component for the lamp, socket, and lensing.

More recently, distributed light systems have found use in vehicles. These may use fiber optics or other means to deliver the light to a desired location. The use of a lens and focusing or dispersing devices may be employed to direct the light.

Such areas as foot wells, door handles, seats, trunks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use.

Vehicles are commonly provided with various types of decorative trim parts. Vehicles also typically have various logos or designs located on interior trim pieces. However, decorative trim and designs in the vehicle cabin are difficult to perceive in darker conditions. Attempts have been made to illuminate trim logos. This is typically done by either placing the logo within the field of a light source or by making the logo element luminescent. The first method is not feasible for logos in most common locations, while the latter method may adversely affect the occupants' vision.

U.K. published patent application 2,492,100 discloses a method of fabricating an illuminated trim panel member in which the panel member comprises a trim element. The method comprises: forming, such as by laser drilling, at least one aperture completely through the trim element; and applying a layer of a light-transmitting coating medium to one side of the trim element to cover at least a portion of the one side and the aperture, whereby light may be transmitted completely through the aperture and through the layer of coating medium for viewing.

As described in Chapter 13 of the *Handbook of Laser Materials Processing* entitled "Hole Drilling," there are two ways of forming apertures or holes using laser beams: percussion drilling and trepanning. Percussion drilling is typically used for hole diameters less than 0.025 in. (0.63 mm), while trepanning is used for drilling holes of larger diameter.

Trepanning

If one uses a rotating optical device, holes up to ≈0.250 in. (6.25 mm) diameter can be laser drilled. So-called "boring heads" rotate the focused laser beam at very high rates. Holes are drilled by either a single pass or multiple passes of the laser beam.

Drilling by trepanning is to cut a hole around its periphery. Depending on the hole diameter, a slug may be produced. Boring heads usually use 2.5-in. focal length lenses and are equipped with gas jets similar to those used for laser cutting applications.

Roundness of the holes produced by boring heads is exact, and repeatability of hole diameter is excellent. Boring-head-hole diameter is established either manually or by use of a programmable controller.

Trepanned holes can also be drilled by interpolation of linear axes, moving either the material or the laser focusing device. Speed of drilling by interpolation is dictated by the size of the linear axes. The linear axes servo system must be properly tuned to produce circular holes. Specialty beam-manipulation devices use very small linear axes to move the focusing device in a circle. The system controller can be programmed to establish desired hole diameters.

Most nonmetals are of one of two types, characterized by their response to exposure to high-energy radiation: those that transform from a solid directly into a vapor without significant liquefaction, and those that transform from solid state into a liquid state before vaporization. Paper is an example of the former; acrylic resin is an example of the latter.

When absorbed by a material, this energy is transformed into energy associated with the motion of atoms or molecules and is capable of being transmitted through solids or fluids by conduction, that is, as heat. Most nonmetals do not conduct heat effectively. Properly applied, the effect of short, high-energy laser pulses is localized to the area of exposure. As such, each pulse of laser energy affects a volume of material consistent with the irradiance of the focuses beam and the specific heat of the material, with negligible impact to material adjacent to the area of exposure.

The total energy required to drill a hole comes from the specific gravity of a material and the volume of material which must be converted from solid to vapor. The rate at which holes can be drilled is determined by the rate at which energy can be input to the material without degrading hole quality.

Hole quality is quantified by the measures of roundness and taper; recast (material that has resolidified in the hole or around the hole entrance); or charring (usually exhibited as a carbonaceous residue). These qualities affect the function of the hole, whether it be air flow, spray pattern, or part fit.

U.S. published patent application 2018/0257557 discloses an illumination device for a motor vehicle. The device includes one or more LED units each having one or more LEDs. The LED units may be RGB LED units. U.S. published patent application 2018/0222383 discloses a motor vehicle which has a central light control device, a plurality of peripheral light control devices distributed within the vehicle, and a plurality of interior light modules each of which has a plurality of light sources and is associated with a peripheral light control device.

It is well known that combining the projected light of one color with the projected light of another color will result in the creation of a third color. It is also well known that three commonly used primary colors—red, blue and green—can be combined in different proportions to generate almost any color in the visible spectrum.

Published U.S. patent application 2018/0190046 discloses an autonomous vehicle and associated mechanical, electrical and electronic hardware, computer software and systems, wired and wireless network communications and a plurality of sensors for autonomous-vehicle operation. The sensors may comprise at least two of a LIDAR sensor, a RADAR sensor, a SONAR sensor, a camera, an IMU, an odometry sensor, a GPS sensor, or a microphone.

This application is related to issued U.S. Pat. No. 10,672,327 assigned to the same assignee as the present application. This application is also related to U.S. Patent Documents 9,834,136; 2013/0181398 and 2018/0218669.

SUMMARY OF EXAMPLE EMBODIMENTS

An object of at least one embodiment of the present invention is to provide a low-profile, backlit panel assembly for displaying imagery and/or data in the form of a two-dimensional array of pixels within a passenger compartment of a vehicle. The imagery may take the form of images of static scenes and/or dynamic or moving images (i.e. animations). The data may include information generally of the type displayed by displays in vehicles.

In carrying out the above object and other objects of at least one embodiment of the present invention, a low-profile, backlit panel assembly for displaying images and/or data within a passenger compartment of a vehicle having a support structure is provided. The assembly includes a substrate panel perforated with a two-dimensional array of closely-spaced holes which extend between front and back surfaces of the panel. The panel is configured to be attached to the support structure. A plurality of semiconductor-based, lighting devices are supported at the back surface of the panel. Each of the lighting devices includes at least one lighting element. Each of the lighting elements is individually addressable to control the luminous intensity of light emitted by the at least one lighting element. Each of the lighting devices is aligned with one of the holes so that light emitted by each of the lighting devices travels through its hole to the passenger compartment in the form of a pixel of a two-dimensional image. Color of light emitted by each of the lighting devices is controlled by controlling the luminous intensity of light emitted by its at least one lighting element.

The panel may comprise a microperforated panel and the microperforations may be spaced between 0.05 mm and 6 mm apart.

Each of the lighting devices may include a plurality of multicolored lighting elements and each of the lighting devices may include a control circuit to individually control each of the lighting elements.

The assembly may include at least one lighting display panel on which the lighting devices are mounted.

Each of the lighting display panels may comprise a printed circuit board.

The substrate panel may be a polymeric panel which is concavely molded. The back surface of the panel may define a recess in which the lighting devices are disposed.

The substrate panel may be a thermoplastic panel configured to be attached to a pillar of the support structure.

The assembly may further comprise a continuous membrane of facing material overlying and in contact with the panel. Light emitted from each of the lighting devices may be transmitted through the membrane to form the image.

The facing material may include leather and the membrane may be tightly stretched and cover the holes at the front surface of the panel.

The image may represent a static scene or object.

The image may include a dynamic or animated image.

Each control circuit may control the color of the light emitted by its lighting device.

Each control circuit may control the luminous intensity of the light emitted by its lighting device.

Each of the lighting devices may be a point light source.

The image may represent vehicle-based information.

Each of the lighting elements of at least one of the lighting devices may be controlled so that its associated image appears to scintillate or flash.

The holes may be microperforations which are laser-drilled in the panel.

The membrane may provide a background for the image.

Further in carrying out the above object and other objects of at least one embodiment of the present invention, a robust, backlit panel assembly for displaying images and/or data within a passenger compartment of a vehicle having a support structure is provided. The assembly includes a substrate panel perforated with a two-dimensional array of closely-spaced holes which extend between front and back surfaces of the panel. The panel is configured to be attached to the support structure. A lighting display panel overlies the back surface of the panel. A plurality of semiconductor-based, lighting devices are mounted on the display panel. Each of the lighting devices include at least one lighting element. Each of the lighting elements is individually addressable to control the luminous intensity of light emitted by the at least one lighting element. Each of the lighting devices is aligned with one of the holes so that light emitted by each of the lighting devices travels through its hole to the passenger compartment in the form of a pixel of a two-dimensional image.

Still further in carrying out the above object and other objects of at least one embodiment of the present invention, a low-profile, backlit panel and control assembly for displaying images and/or data within a passenger compartment of a vehicle having a support structure is provided. The assembly includes a substrate panel perforated with a two-dimensional array of closely-spaced holes which extend between front and back surfaces of the panel. The panel is configured to be attached to the support structure. A plurality of semiconductor-based, lighting devices are supported at the back surface of the panel. Each of the lighting devices including at least one lighting element. Each of the lighting elements is individually addressable to control the luminous intensity of light emitted by the at least one lighting element. Each of the lighting devices is aligned with one of the holes so that light emitted by each of the lighting devices travels through its hole to the passenger compartment in the form of a pixel of a two-dimensional image. A controller individually controls each lighting element of the lighting devices.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the term "substrate" refers to any flexible, semi-flexible or rigid single or multi-layer component having a surface to which a decorative membrane is or can be applied. The substrate may be made of polymers and other plastics, as well as composite materials. Furthermore, the shape of the substrate and, particularly, the surface to be covered can be any part of an assembly or device manufactured by any of various methods, such as, without limitation, conventional molding, extruding, or otherwise fabricated.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent layers.

As used herein, the term "microperforations" may include circular and/or non-circular shaped micro-holes. The term "non-circular" may include any arbitrary shape that is not circular. The term "diameter" may be taken to mean the minimum distance across an opening of the microperforation at a point through the centroid of the microperforation, where the centroid and diameter are based on the area of the microperforation on a surface of the panel in which the microperforation is present. For example, when the microperforations are substantially circularly cylindrical, the diameter is the distance across the center of the circle defining the openings. The microperforations may be non-circular such that the microperforation is not circularly cylindrical. In these cases, the "diameter" may be taken to mean the minimum distance across the non-circular opening of the microperforation that crosses through the centroid. The terms "hole" and "microperforation" are used interchangeably.

In some embodiments, the microperforations may be spaced (e.g., "pitch") between about 0.05 mm and 6 mm apart. In the case of non-uniform spacings, the pitch may be calculated as the average distance between microperforations as if they are distributed evenly.

In some embodiments, the microperforations have a generally circular cross-section through the thickness of the panel. In some embodiments, the microperforations have a non-circular cross-section through the thickness of the panel. In some embodiments, the shape of the microperforation through a cross-section of the panel varies, or is substantially constant.

In some embodiments, the hole diameter is between about 0.02 mm and 5 mm, between about 0.05 mm and 2 mm, between about 0.1 mm and 2 mm, between about 0.1 mm and about 1 mm, and between about 0.1 mm and 0.6 mm.

Figure 1:
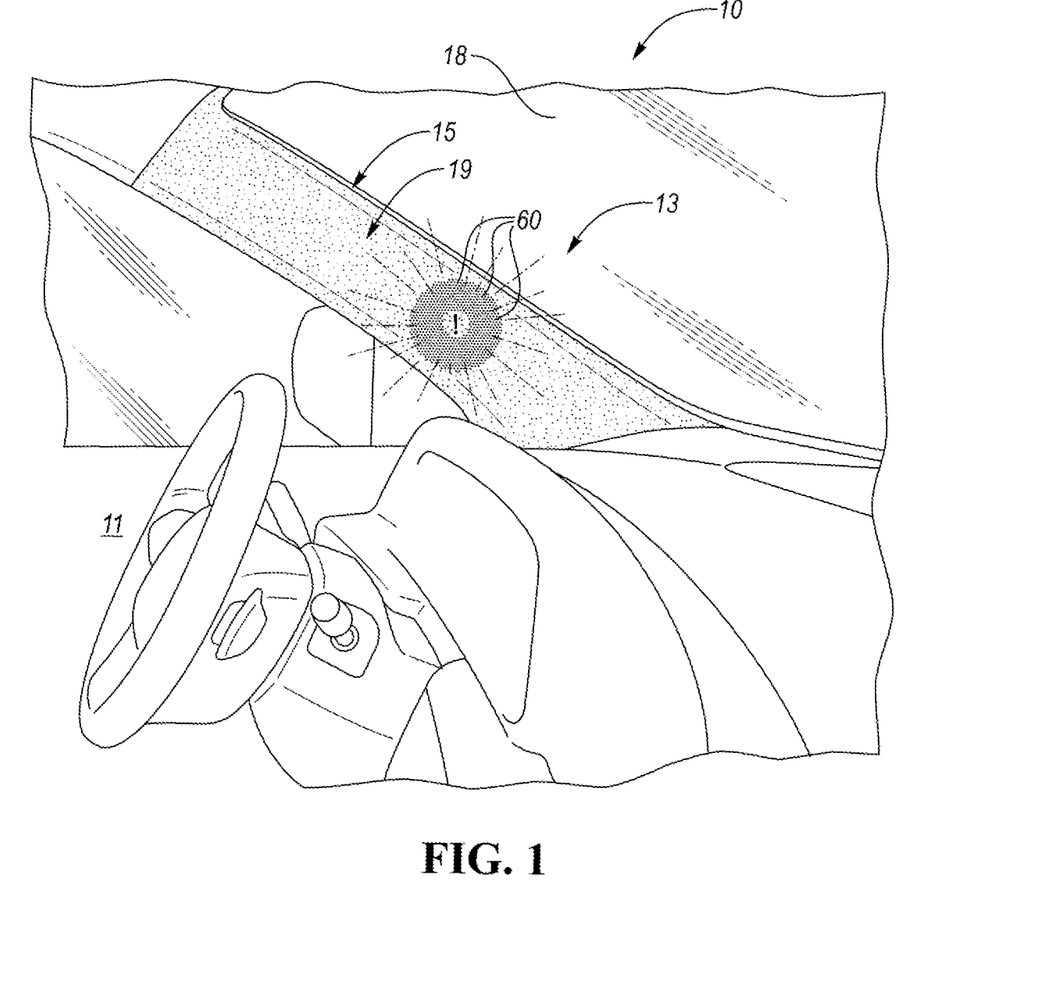
FIG. 1 is an interior, perspective, environmental view, partially broken away, of a passenger compartment of an automotive vehicle in which at least one embodiment of the present invention can be used to display images and/or data therein.

Referring now to the drawing Figures, FIG. 1 illustrates a vehicle, generally indicated at 10, in which at least one embodiment of the present invention can be employed. The vehicle 10 includes a passenger compartment 11 and a pillar 34 (i.e., FIG. 2) of a support structure of the vehicle 10. The vehicle 10 can include a number of sensors such as a microphone to generate sensor data for use by the vehicle's electronic control unit (ECU) as well as a controller disclosed herein.

The vehicle 10 is illustrative of any type of automobile or other vehicle in which at least one embodiment of the present invention can be used. For example, the vehicle 10 may include, but is not limited to, a car, a truck, an SUV, a semi-truck, a tractor, a plane, a boat, a train, etc.

Figure 2:
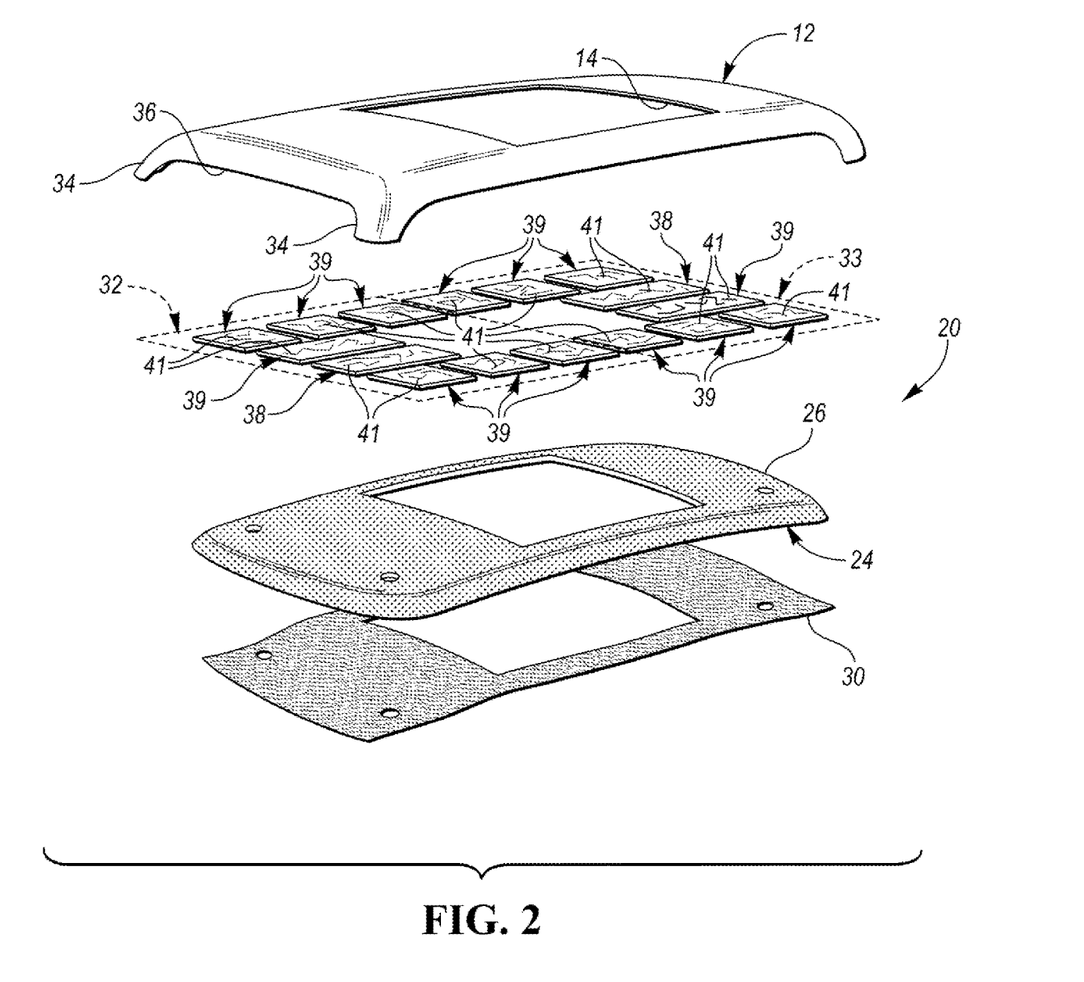
FIG. 2 is an exploded, perspective view of a low-profile, backlit panel assembly constructed in accordance with at least one embodiment of the present invention and underlying a roof of the vehicle of FIG. 3.
Figure 3:
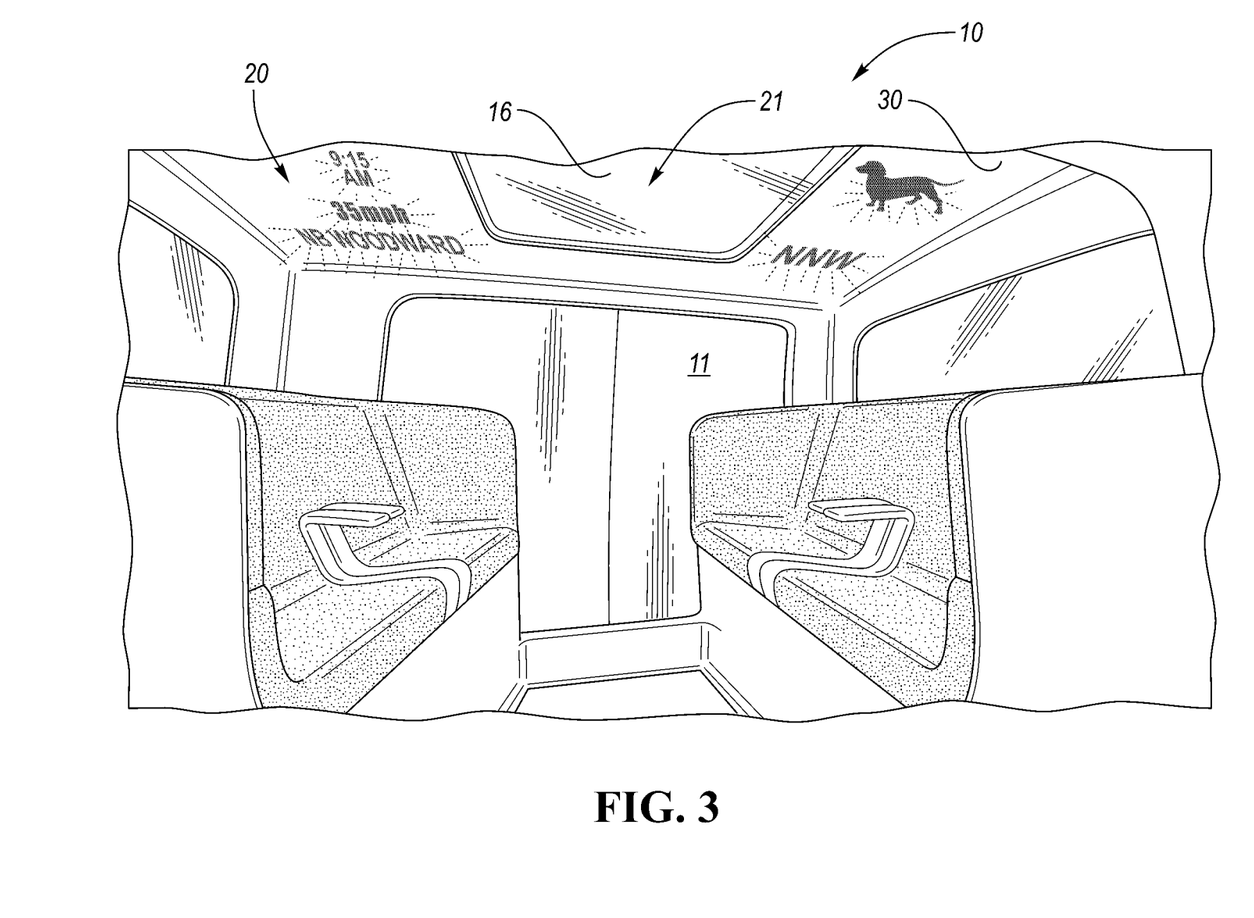
FIG. 3 is an interior, perspective, environmental view, partially broken away, of a passenger compartment or seating area within an autonomous vehicle showing various interior lighting systems including dome lighting systems and images and data displayed by one or more backlit panel assemblies constructed in accordance with at least one embodiment of the present invention.

Referring to FIGS. 2 and 3, a roof, generally indicated 12, of an autonomous vehicle 10 forms part of a support structure of the vehicle 10 and covers a passenger compartment 11 in which passengers or occupants of the vehicle 10 ride.

The roof 12 may include a moonroof opening 14. For purposes of this description, the terms sunroof and moonroof are used interchangeably, such that the moonroof opening 14 may alternatively be referred to as a sunroof opening. A moonroof assembly, generally indicated at 21, fills the moonroof opening 14 and some of the adjacent structure of the roof 12. The moonroof assembly 21 facilities sliding, tilting, or other movement of a glass or opaque panel 16 that selectively covers the moonroof opening 14.

The roof 12 is bounded by a windshield or windscreen 18 at a forward position of the vehicle 10, relative to the direction of travel. Similarly, the roof 12 generally terminates at a similar window or windscreen at a rearward portion of the vehicle 10. The windscreen 18 and the windscreen at the rear may be different in production vehicles.

Figure 9A:
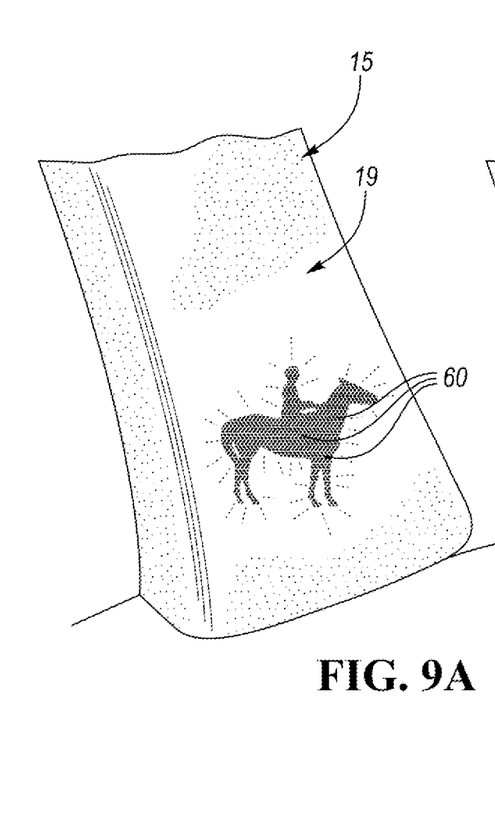
FIGS. 9A, 9B, and 9C are side schematic views, partially broken away, of a panel assembly having a porous, continuous membrane of facing material which transmits colored light therethrough to sequentially show a series of images (i.e., an animation) depicting the moment of a horse.
Figure 9B:
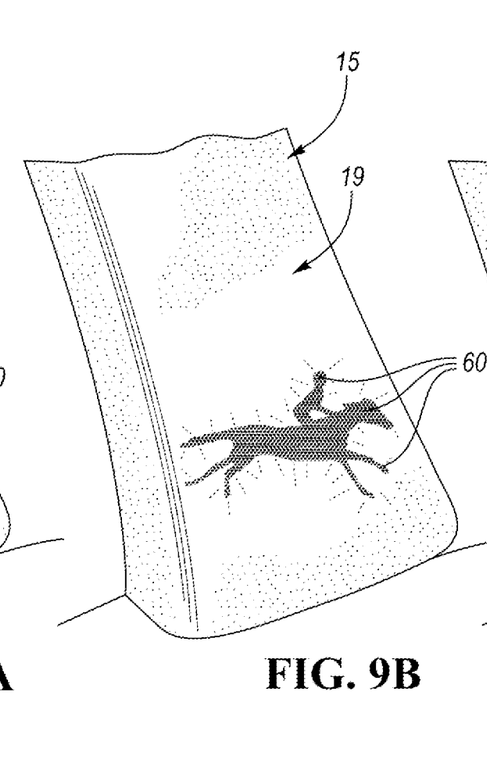
Figure 9C:
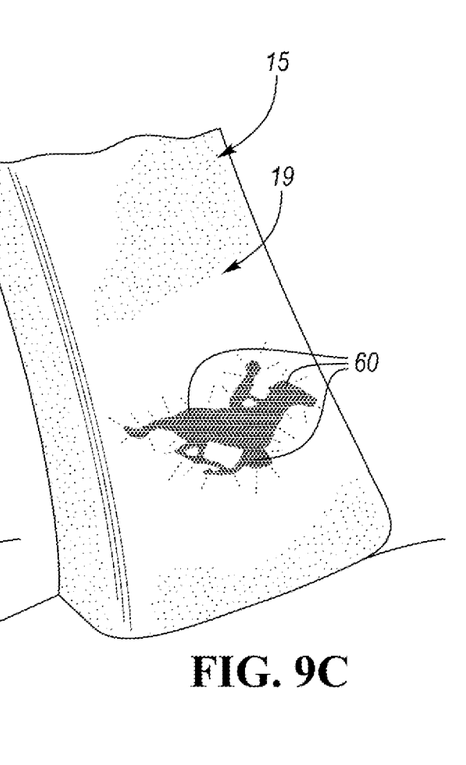

A low-profile backlit panel assembly, generally indicated at 13 in FIG. 1, is configured to display images and or data (as shown by the flashing warning sign and exclamation mark) within the passenger compartment 11 of the vehicle 10 of FIG. 1. The assembly 13 includes a substrate panel, generally indicated at 15, perforated with a two-dimensional array of closely-spaced holes 60 which extend between front and back surfaces of the panel 15. As shown in FIGS. 9A, 9B, and 9C, the images may be animated or moving images of an object such as a galloping horse.

The assembly 13 includes a continuous membrane, generally indicated at 19, of facing material overlying and in contact with the panel 15. The membrane 19 is tightly stretched over the panel 15 at its front surface. The membrane 19 is typically porous and light transmitting. The membrane 19 may be made of leather and may be naturally porous or have the holes 60 laser-drilled therethrough.

A headliner or panel assembly, generally indicated at 20 in FIGS. 2 and 3, sits below the roof 12 and includes components providing a functional and an aesthetic barrier between the roof 12 and the passenger compartment 11. The headliner assembly 20 includes multiple components and may also be referred to as a headliner or low-profile backlit panel assembly.

Figure 8:
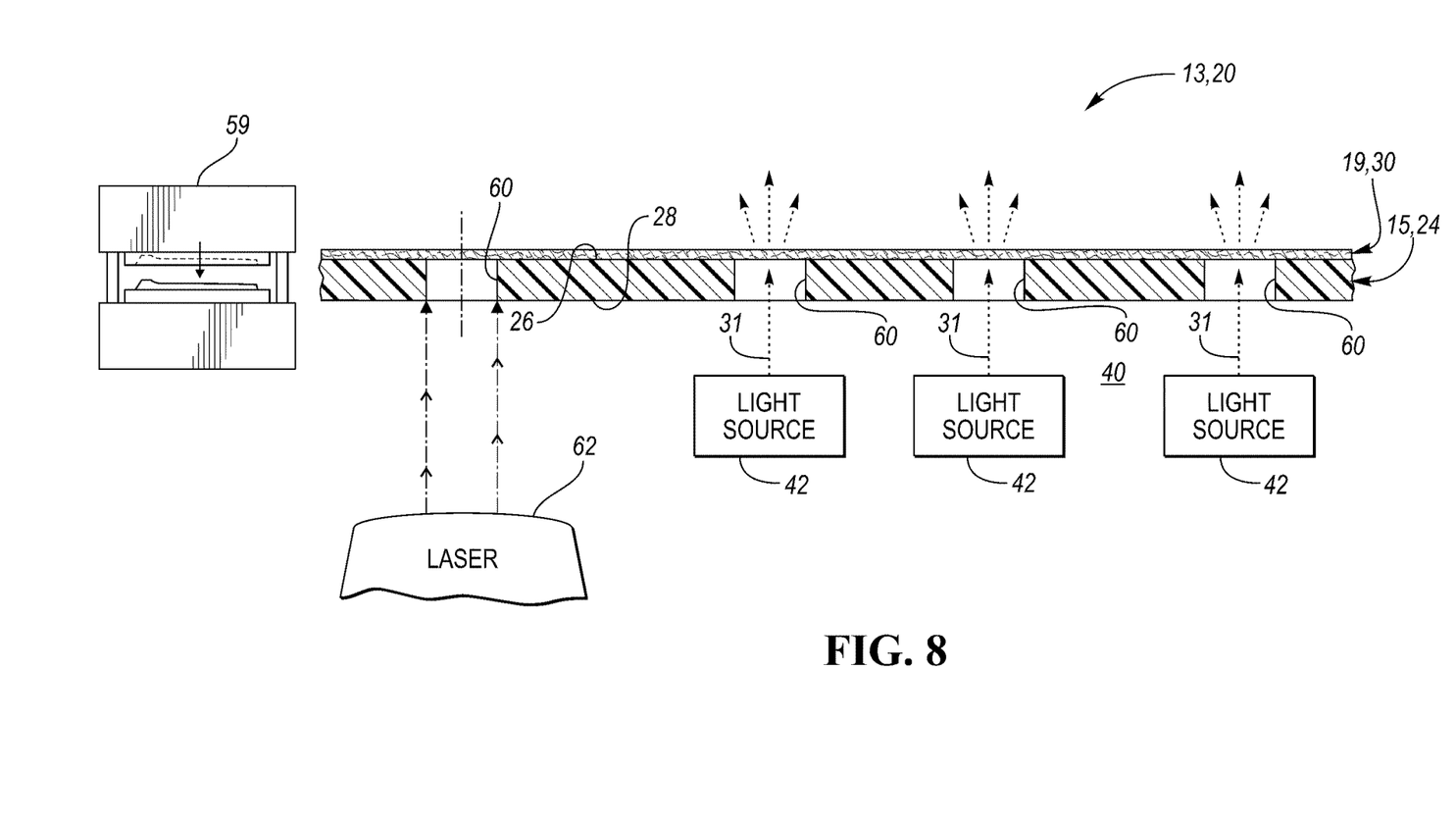
FIG. 8 is a schematic view, partially broken away in cross-section, which illustrates an injection molding machine, a hole-drilling laser and an assembly constructed in accordance with at least one embodiment of the present invention.

The headliner 20 is preferably, a lightweight, thermoplastic headliner, constructed in accordance with at least one embodiment of the present invention. The headliner 20 includes a stiff, self-supporting, substrate panel or thermoplastic sheet, generally indicated at 24, which is adapted to be mounted adjacent the roof 12 so as to underlie the roof 12 and shield the roof 12 from view. Like the panel 15, the sheet 24 has an upper surface or face 26 and a lower surface or face 28 (FIGS. 8 and 10B).

The headliner 20 may be attached to the vehicle roof 12 of the vehicle support structure by double-sided tape or a heat-activated adhesive. Alternatively, the upper surface 26 of the thermoplastic sheet 24 may be provided with integrally formed fasteners (not shown) to fasten the headliner 20 to complementarily-formed fasteners (not shown) formed on the lower surface of the vehicle roof 12.

The thermoplastic resin of the thermoplastic sheet 24, as well as the panel 15, may be TPO, ABS, PC/ABS, or polypropylene with a mold-in color. The thermoplastic sheet 24 and the panel 15 are stiff and self-supporting, yet the sheet 24 is flexible enough to bend slightly so that the headliner 20 can be inserted between two spaced apart A-pillars 34 of the vehicle roof 12 which help to define a front windshield opening. (The panel 15 is configured to be attached to one of A-pillars 34). The substrate 24 and the panel 15 are dimensionally stable and may be formed from other materials such as hard foam, plastic, wood, or composites.

A continuous membrane of facing material or cover 30 of the headliner 20 has an A-surface and covers the substrate 24 and spans substantially the entire headliner 20. The cover 30 overlies and is in contact with the substrate panel 24. The cover 30 is typically tightly stretched over the front surface 26 at the panel 24. The cover stock or cover 30 may be formed by bonding a decorative, textile sheet or fabric to the substrate 24 to give the headliner 20 a soft, padded feel. The cover stock 30 may be a single material which is both flexible and has an aesthetically pleasing tactile surface such as leather. The cover stock 30 is wrapped, pulled, and adhered over the substrate 24. The cover stock 30 may be compressible and flexible, such that the cover stock 30 may be bent or pulled around tight corners and may have a variable thickness depending upon the assembly process.

The display assembly also includes a forward or first set of lighting display panels, generally indicated at 32, and a rearward set of lighting display panels, generally indicated at 33. Each set of the display panels 32 or 33 (as well as a display panel (not shown) for use as with the panel assembly 17 of FIG. 1) preferably includes one or more printed circuit boards 38 and 39 all of which preferably support a plurality of semiconductor-based lighting devices, generally indicated at 42. The printed circuit board 38 of the first set 32 not only supports a plurality of lighting devices 42 at a front face thereof, but also supports a first controller, generally indicated at 40, on a rear face 41 thereof for controlling the semiconductor-based lighting devices 42.

Each of the lighting devices 42 preferably comprises a RGB LED surface mounted device (i.e SMD). Each device 42 contains an integrated circuit (IC) which includes a control circuit having a current driver and signal processing circuitry necessary to control and activate the LED function. In particular, each control circuit preferably includes a signal shaping amplifier circuit, a constant current driver circuit and an RC oscillator.

Figure 7:
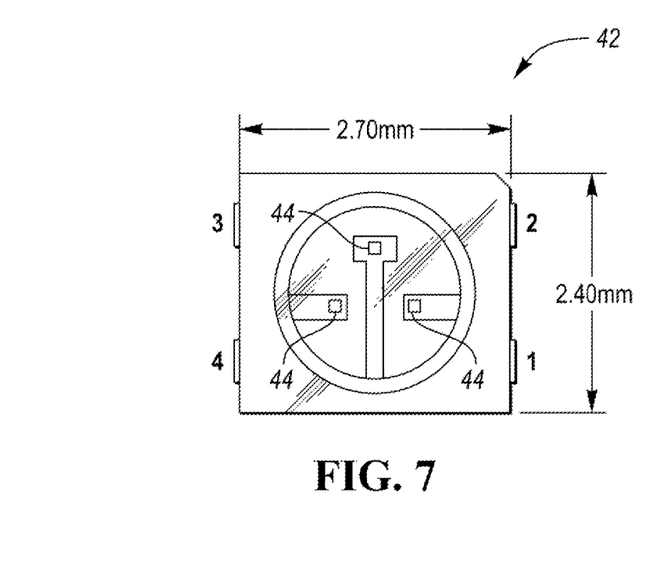
FIG. 7 is an enlarged top plan schematic view of the RGB LED device of FIG. 6, with typical dimensions in millimeters (i.e. mm)

Preferably, each lighting device 42 has a package size and pinouts as well as LED support locations 44 as shown in FIG. 7. Each lighting device 42 may be supplied by Sun-Wave of Korea and, preferably, comprises an RGB LED device integrated with its IC. The Sun-Wave devices 42 operates in the 800K Hz range. The devices 42 are serially interconnected by signal traces on their respective PC boards 38 and 39. Obviously, other lighting devices (even smaller than the lighting devices 42) may be used if a higher resolution for the displayed image is desired.

The devices 42 and their interconnecting signal traces, and their relative locations on their PC boards 38 and 39 (as well as the devices and traces on the PC board of the panel assembly 13) represent a group or two-dimensional array of closely-spaced pixels at the front of the assembly 20 as shown in FIG. 3 (or at the front of the assembly 13 in FIG. 1).

Figure 4:
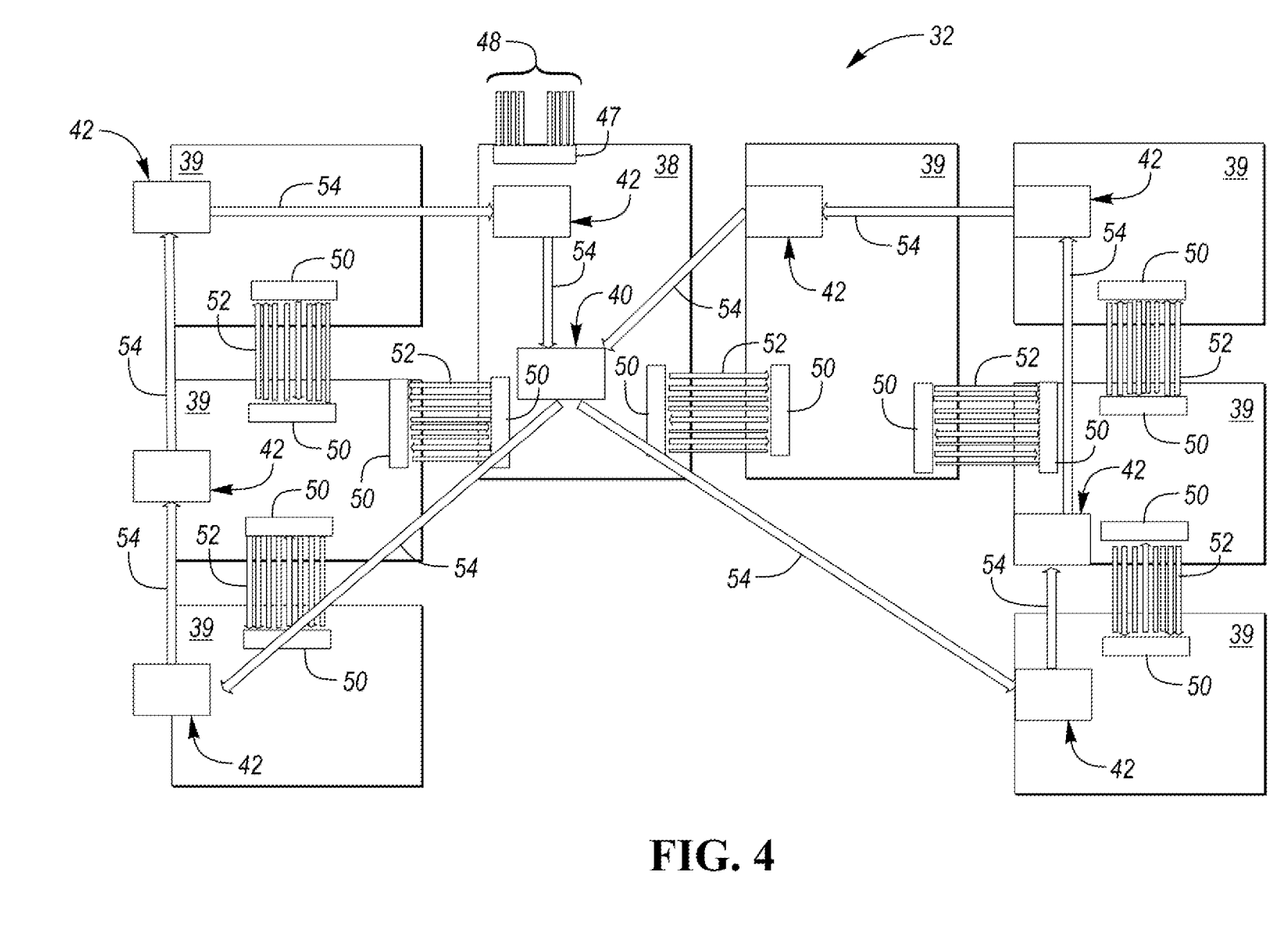
FIG. 4 is a block diagram, schematic view of a set of interconnected printed circuit boards and associated circuitry mounted thereon; two such sets are typically used with a vehicle headliner substrate panel to create computer-generated imagery and/or data within the passenger compartment of FIG. 3.

Referring now to FIG. 4, the PC board 38 having the controller 40 supported and mounted thereon is connected to the PC boards 39, which, in turn, are connected together by electrical connectors 50 and internal buses 52. The internal buses 52 connect the controller 40 to the devices 42 in a daisy chain configuration as shown in FIG. 5B. The assembly 20 implements serial peripheral interface (SPI) and its devices are connected in the daisy chain configuration. The PC board 38 having the controller 40 is connected to the vehicle's electronic control unit 46 via a connector 47 (FIG. 4) and a vehicle-based bus such as a CAN bus 48.

The CAN bus 48 typically has lines or conductors for various command or control signals and data to and from the remote control unit 46 and the controller 40. The internal busses 52 typically have lines or conductors for electrical power and command or control data signal to and from the controller 40 and each device 42. Arrows 54 represent the flow of signals from the controller 40 to the serially connected devices 42 mounted on their respective PC boards 38 and 39 and back to the controller 40.

The lighting devices 42 (as well as the lighting devices of the panel assembly 13) are mounted and suspended on their respective display panels or boards 38 and 39 so that each lighting device 42 is aligned with a funnel-shaped hole or aperture 60 formed completely through the substrate 24 to create a pattern of lights which represent images and/or data (i.e. as shown in FIGS. 1 and 3) in the passenger compartments 11 of the vehicles 10 of FIGS. 1 and 3 when the lighting elements (i.e. LEDs) of the devices 42 are energized. The lighting devices 42 and their associated holes 60 are sized and shaped to create pixels of images (which may be a computer-generated animation as shown in FIGS. 9A, 9B, and 9c) at the front of the assembly 20 (or the assembly 13) within the passenger compartments 11 of the vehicles 10 of FIGS. 1 and 3. The images may include various symbols, navigation images, night-vision information, warning signals, text messages, static images, dynamic or animated images, data about the vehicle 10 and its surroundings, heads-up display information, when one or more of the two-dimensional array of closely-spaced pixels are formed.

Each lighting device 42 may or may not have any visible surface area, and may appear as a point light source. Objects are called point sources because they appear to be a point.

A pixel is a physical point in an image, or the smallest addressable element in an all-points, addressable display device as disclosed herein. A pixel is the smallest controllable element of a picture or image represented on a screen or display device. The intensity and, consequently, the color of each pixel of the present invention is variable. In color imaging or display systems, a color is typically represented by three or four component intensities such as red, green, and blue or cyan, magenta, yellow and black.

Figure 5A:
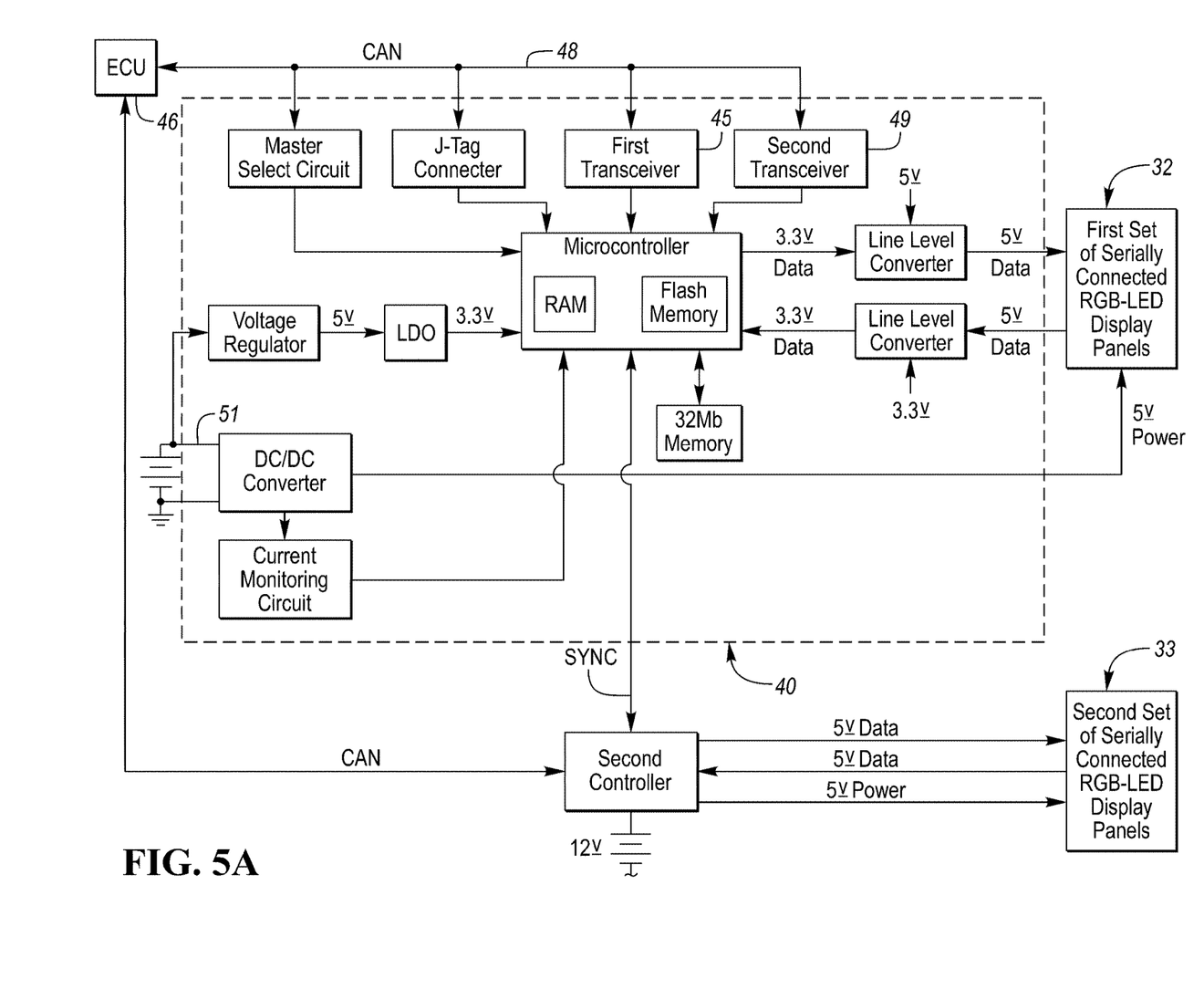
FIG. 5A is a detailed block diagram schematic view of a controller for controlling first and second sets of serially connected RGB-LED display panels.
Figure 5B:
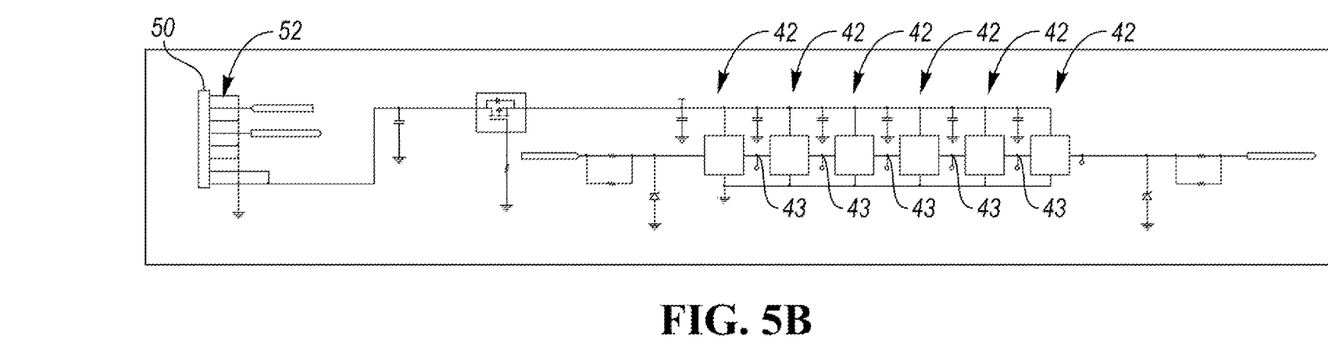
FIG. 5B is a schematic view of a plurality of serially connected RGB LEDs, decoupling capacitors, connectors and other discrete circuit elements which populate one of the printed circuit boards of FIG. 4.
Figure 6:
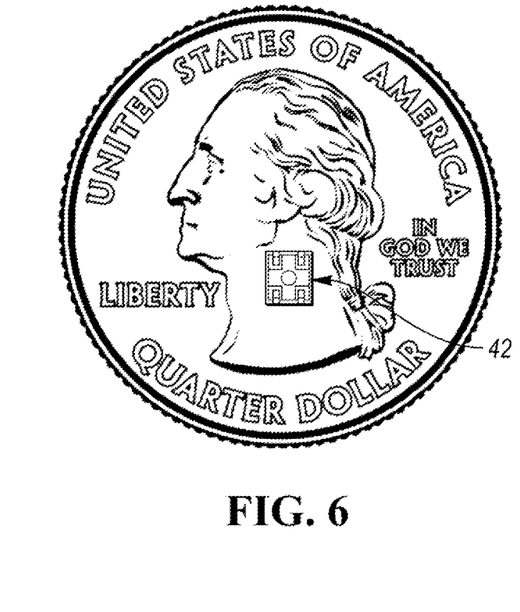
FIG. 6 is an enlarged top plan view of a U.S. quarter supporting one of the RGB LEDs at its upper (i.e. head) surface to show the relative size of the lighting device.

Referring now to FIG. 5A, the controller 40 includes a power inlet terminal 51 adapted to receive electrical power from a vehicle 12 volt DC power source and a command input terminal via a first transceiver 45 adapted to receive command signals from the remote electronic control unit (ECU) 46. The controller 40 could be implemented or realized with discrete logic or a microcontroller (i.e., MCU) depending on the system's requirements.

The controller 40 preferably includes the microcontroller including control logic which may alternatively be found within other circuitry. The controller 40 typically receives command signals at the input terminal via the first transceiver 45 from the remote electronic control unit (ECU) 46 over or through a vehicle-based bus 48 (i.e. CAN). Command signals are interpreted by the microcontroller. The microcontroller generates control data signals which, in turn, are received by the control circuits of the lighting devices 42. The microcontroller could be replaced with an FPGA or an extensive array of discrete modules.

An LDO (i.e., low dropout) DC linear voltage regulator provides regulated voltage to the MCU after initial voltage regulation by a voltage regulator coupled to the terminal 51 which receives the battery voltage.

The remote ECU 46 typically has a microprocessor, called a central processing unit (CPU), in communication with a memory management unit (MMU). The MMU controls the movement of data among the various computer readable storage media and communicates data to and from the CPU. The computer readable storage media preferably include volatile and nonvolatile storage in read-only memory (ROM), random-access memory (RAM), and keep-alive memory (KAM). For example, KAM may be used to store various operating variables while the CPU is powered down. The computer-readable storage media may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the CPU in controlling the backlit panel assembly 20 or vehicle into which the panel assembly 20 is mounted.

The computer-readable storage media may also include floppy disks, CD-ROMs, hard disks, and the like. The CPU communicates with various sensors, switches and/or actuators directly or indirectly via an input/output (I/O) and actuators directly or indirectly via an input/output (I/O) interface or vehicle bus (i.e., CAN, LIN, etc.) The interface may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Some controller architectures do not contain an MMU. If no MMU is employed, the CPU manages data and connects directly to ROM, RAM, and KAM coupled to the MMU or CPU depending upon the particular application.

The various components or functions of the controller 40 of FIG. 5A are preferably implemented by the separate or stand alone controller as illustrated, depending upon the particular application and implementation. The MCU of the controller 40 typically includes the control logic to control the lighting devices 42. The control logic may be implemented in hardware, software, or a combination of hardware and software.

The controller 40 of FIG. 5A comprises power circuitry for powering the lighting device 42, and the MCU (through the LDO) from the vehicle's 12 VDC power supply. In normal operation, with the vehicle's 12 VDC present, the microcontroller's power will be sourced through the input terminal 51 that receives the vehicle's 12 VDC power.

As will be appreciated by one of ordinary skill in the art, one or more memory devices within the ECU and/or the controller 40 may store a plurality of activation schemes for the lighting elements of the lighting devices 42 and may represent any one or more of a number of computer-based images which may flash in various colors.

Preferably, the control logic is implemented primarily in software executed by a microprocessor-based controller 40 or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by the computer of the microcontroller to control the individual lighting elements of the assembly 20. The computer-readable storage medium or media may be any of a number of known physical devices which utilize electric, magnetic and/or optical devices to temporarily or persistently store executable instructions and associated calibration information, operating variables, and the like.

The vehicle bus such as the local interconnect network (LIN) or the CAN bus 48 is capable of two-way communications. A battery voltage power line and a ground line is provided to the controller 40. The controller 40 typically includes a transceiver interface either within or outside (as shown in FIG. 5A) the MCU.

The power sources or supplies of the controller 40 supply electric power of predetermined voltage levels to the MCU and each set of display panels 32 and 33 through the LDO and a DC/DC converter, respectively. Each transceiver 45 or 49 is a communications interface circuit connected to the network or vehicle bus 48 for communications and operates as a receiver section for the MCU and a transmitter section back to the ECU.

The MCU of the controller 40 typically includes one or more memory circuits and may be configured as a conventional microcomputer including a CPU, a ROM, a RAM, and the like or as a hardwired logic circuit.

The controller 40 may perform data communications regularly through the CAN bus 48. In such data communications, the controller 40 may transmit static data indicating the state of each lighting device 42 to the ECU 46.

The following are examples of electronic circuitry for each of the controllers of FIG. 5A and which are substantially identical:

The two controllers exercises control over all system aspects of the headliner lighting system or assemblies. Each controller includes a central CPU (central processing unit), three direct current power supplies, a 32 Mb flash memory device, 2 CAN interfaces, a set (2) of line level converters, and a group of discreet components (master select circuit) to execute a master select feature. The master select circuit allows for the identification of which of the two sets of panels 32 and 33 is given synchronizing control over the other set of panels. It also contains a current sensing feature via a current monitoring circuit which detects when the load drops through the DC/DC converter and, informs the microcontroller when this happens. This circuit detects when LEDs become non-functional and do not draw power from the power supply. The different devices include:

CPU (i.e. microcontroller): an NXP device is used with dual SPI outputs to drive the serial control data signals sent to the LEDs of the devices 42. The microcontroller internally has 2 Mb of flash memory and 256 Kb of RAM. It is the central control and monitor of all electronic signals of the system.

Power supply 1: A DC/DC converter is used to supply 5-volt power the all the LEDs of the devices 42 on the 8 panel set of panels. It has an input from the vehicle 12-volts power supply. This supply is enabled and monitored by the microcontroller.

Power supply 2. A voltage regulator regulates the voltage from a 12-volt input to a 5-volt output. It supplies power to the 2 CAN interfaces, one of the two line level converters, current sense and master select groups of components. This supply is also monitored by the microcontroller.

Power supply 3: This supply has a 5-volt input from power supply 2 and regulates a 3.3v output. This 3.3 volt source powers the microcontroller, a 32 Mb memory chip, the second line level converter, and both the CAN interface ports. This supply is also monitored by the microcontroller.

Memory Chip: A 32 Mb flash memory chip is connected directly to the microcontroller. This is utilized to store large animation data files which are used to generate the imagery.

CAN ports: There are 2 identical CAN ports on the control panel 38. The first port and its transceiver 45 allows the vehicle 10 to exercise control over the controller 40. The second CAN port with its transceiver 49 is implemented to allow for audio input control signals for the ECU 46 over the CAN 48 to synchronize the LED brightness levels to music or sound.

Line level converters: There are two line level converters. One is used to convert the 3.3v output from the microcontroller to a 5v level to drive control data signals to the RGB LEDs. The second line level converter converts the voltage of the control data signals from the LEDs (5v) back into 3.3v and into the microcontroller. Preferably, the control data signals are 24-bit, 8 bits for each LED.

J-Tag Connector. A standard 20 pin J-Tag connector allows access to the processor of the microcontroller for programming and flashing purposes.

Figure 10A:
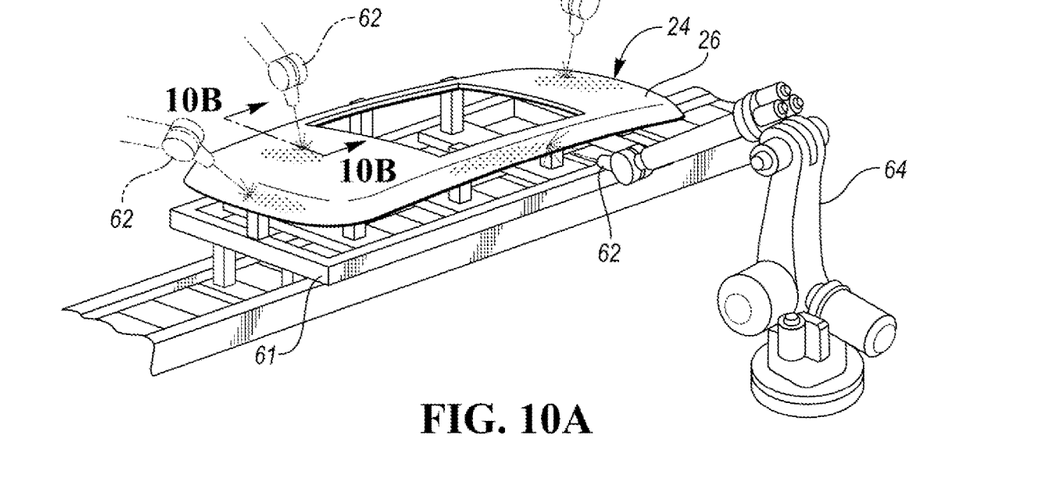
FIG. 10A is a schematic, perspective view of a program-controlled, industrial laser-robot drilling holes in the fixtured substrate panel of FIG. 2 via focused laser beams; various work positions of an end effector and a hole-drilling laser carried by the laser robot are illustrated by phantom lines.
Figure 10B:
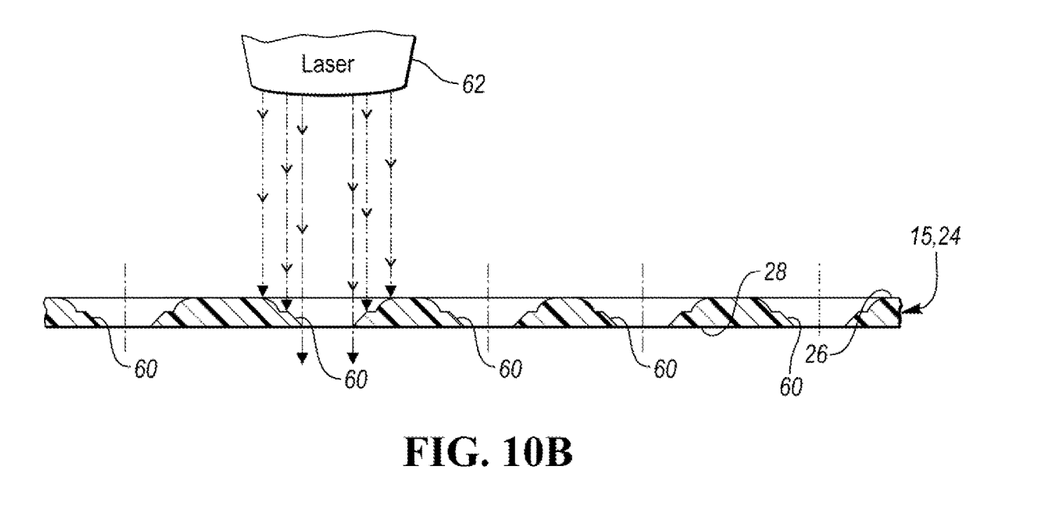
FIG. 10B is a side view, partially broken away and in cross-section, taken along lines 10B-10B of FIG. 10A showing the substrate panel perforated with a plurality of closely-spaced holes by the hole-drilling laser of FIG. 10A.

FIGS. 8, 10A and 10B illustrates injection molding of the substrate panels 15 and 24 by molding apparatus 59 followed by laser drilling of holes 60 in the substrate panels 15 and 24 held by a fixture 61 (for the substrate panel 24) using a laser 62 mounted as an end effecter at the distal end of the arm of a robot 64. It is to be understood that the laser 62 includes a lens to provide focused beams of laser energy to drill the funnel-shaped holes 60 of FIG. 10B or the cylindrical holes 60 of FIG. 8. Also, the panel 15 may be held by a fixture (not shown) so that the laser-robot 64 can laser-drill the holes 60 therein.

FIGS. 9A, 9B and 9C are example side views showing light emitted through a porous, light-transmitting cover stock 19 after the light rays 31 from their LEDs have traveled through their holes. The resulting images comprise an animated image sequence of a galloping horse. Obviously, holes 60 of smaller diameters may be used to represent objects at a higher resolution.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A low-profile, backlit panel assembly for displaying images within a passenger compartment of a vehicle having a support structure, the assembly comprising:

a substrate panel perforated with a two-dimensional array of closely-spaced microperforations which extend between front and back surfaces of the panel, the panel being configured to be attached to the support structure; and a plurality of semiconductor-based, programmable lighting devices supported at the back surface of the panel, each of the lighting devices including at least one lighting element, each of the lighting elements being individually addressable to control a luminous intensity and a color of light emitted by the lighting devices from the lighting elements, each of the lighting devices being respectively aligned with a single microperforation of the two-dimensional array of microperforations so that the light emitted by the lighting devices travels through the microperforations to display two-dimensional images within the passenger compartment with the light emitted by each of the lighting devices traveling through its microperforation to the passenger compartment in the form of a pixel of one or more of the images, the lighting devices being independently controllable from one another such that a group of the lighting devices emit light to display one of the images at a given time according to a programmed activation scheme and a different group of the lighting devices emit light to display a different one of the images at another time according to the programmed activation scheme, and wherein the two-dimensional array of microperforations of the panel has an array configuration different than an array configuration of the pixels of any of the images, a resolution of each image of the images is based on size and shape of the lighting devices and of the microperforations, and the microperforations are sized, shaped, and spaced to conceal the lighting devices supported at the back surface of the panel and to shield the support structure from view.

2. The assembly as claimed in claim 1, wherein the panel comprises a microperforated panel and wherein each of the microperforations has a diameter between about 0.05 mm and 2 mm.

3. The assembly as claimed in claim 2, wherein the substrate panel is a polymeric panel which is concavely molded and wherein the back surface of the panel defines a recess in which the lighting devices are disposed.

4. The assembly as claimed in claim 3, wherein the substrate panel is a thermoplastic panel configured to be attached to a pillar of the support structure.

5. The assembly as claimed in claim 1, wherein each of the lighting devices includes a control circuit to individually control each of its lighting elements.

6. The assembly as claimed in claim 5, wherein each control circuit controls the color of the light emitted by its lighting device.

7. The assembly as claimed in claim 5, wherein each control circuit controls the luminous intensity of the light emitted by its lighting device.

8. The assembly as claimed in claim 5, wherein each of the lighting elements of at least one of the lighting devices is controlled by its control circuit so that the images appears to scintillate or flash.

9. The assembly as claimed in claim 1, further comprising at least one lighting display panel on which the lighting devices are mounted.

10. The assembly as claimed in claim 9, wherein each of the lighting display panels comprises a printed circuit board.

11. The assembly as claimed in claim 1, further comprising a continuous membrane of facing material overlying and in contact with the panel, wherein light emitted from each of the lighting devices is transmitted through the membrane to form the images.

12. The assembly as claimed in claim 11, wherein the facing material includes leather and wherein the membrane is tightly stretched over and covers the microperforations at the front surface of the panel.

13. The assembly as claimed in claim 11, wherein the membrane provides a background for the images.

14. The assembly as claimed in claim 1, wherein the images are images of an animation.

15. The assembly as claimed in claim 1, wherein each of the lighting devices is a point light source.

16. The assembly as claimed in claim 1, wherein the images represent vehicle-based information.

17. The assembly as claimed in claim 1, wherein the panel is injection molded.

18. A low-profile, backlit panel and control assembly for displaying images within a passenger compartment of a vehicle having a support structure, the assembly comprising:
a substrate panel perforated with a two-dimensional array of closely-spaced microperforations which extend between front and back surfaces of the panel, the panel being configured to be attached to the support structure;
a plurality of semiconductor-based, programmable lighting devices supported at the rear surface of the panel, each of the lighting devices including at least one lighting element, each of the lighting elements being individually addressable to control a luminous intensity and a color of light emitted by the lighting devices from the lighting elements, wherein each of the lighting devices is respectively aligned with a single microperforation of the two-dimensional array of microperforations so that the light emitted by the lighting devices travels through the microperforations to display two-dimensional images within the passenger compartment with the light emitted by each of the lighting devices traveling through its microperforation to the passenger compartment in the form of a pixel of one or more of the images; and
a controller to individually control the lighting devices independently from one another such that a group of the lighting devices emit light to display one of the images at a given time according to a programmed activation scheme and a different group of the lighting devices emit light to display a different one of the images at another time according to the programmed activation scheme, and wherein the two-dimensional array of microperforations of the panel has an array configuration different than an array configuration of the pixels of any of the images, a resolution of each two-dimensional image of the images is based on size and shape of the lighting devices and of the microperforations, and the microperforations are sized, shaped, and spaced to conceal the lighting devices supported at the rear surface of the panel and to shield the support structure from view.

* * * * *